United States Patent [19]

Day

[11] Patent Number: 4,658,794
[45] Date of Patent: Apr. 21, 1987

[54] FUEL INJECTION CONTROL

[75] Inventor: Eric Day, Longmeadow, Mass.

[73] Assignee: United Technologies Diesel Systems, Inc., Springfield, Mass.

[21] Appl. No.: 796,057

[22] Filed: Nov. 7, 1985

[51] Int. Cl.$^4$ ............................................. F02M 59/20
[52] U.S. Cl. ........................................ 123/501; 123/357
[58] Field of Search ............... 123/357, 425, 501, 502

[56] References Cited

U.S. PATENT DOCUMENTS

| | | | |
|---|---|---|---|
| 3,726,608 | 4/1973 | Bostwick et al. | 417/212 |
| 4,033,310 | 7/1977 | Nicolls | 123/502 |
| 4,265,200 | 5/1981 | Wessel et al. | 123/501 |
| 4,417,554 | 11/1983 | Dinger | 123/501 X |
| 4,449,501 | 5/1984 | Greeves | 123/501 X |
| 4,463,729 | 8/1984 | Bullis et al. | 123/478 |
| 4,463,733 | 8/1984 | Tsai | 123/501 |
| 4,583,507 | 4/1986 | Greeves et al. | 123/501 X |

FOREIGN PATENT DOCUMENTS 203843  11/1984  Japan .................................. 123/502

Primary Examiner—Tony M. Argenbright
Attorney, Agent, or Firm—Stephen A. Schneeberger

[57] ABSTRACT

Information relating to relative fuel pump camshaft advance angle is compared with a SOC signal indicative of the start of combustion in a reference cylinder to generate an adaptive trim table which is used, in a first control scheme to calculate an actual combustion angle for closed loop control over combustion timing only in the event of a loss of the SOC signal. In an alternate control scheme, the values from the adaptive trim table are always used to calculate the actual combustion angle for closed loop control.

2 Claims, 1 Drawing Figure

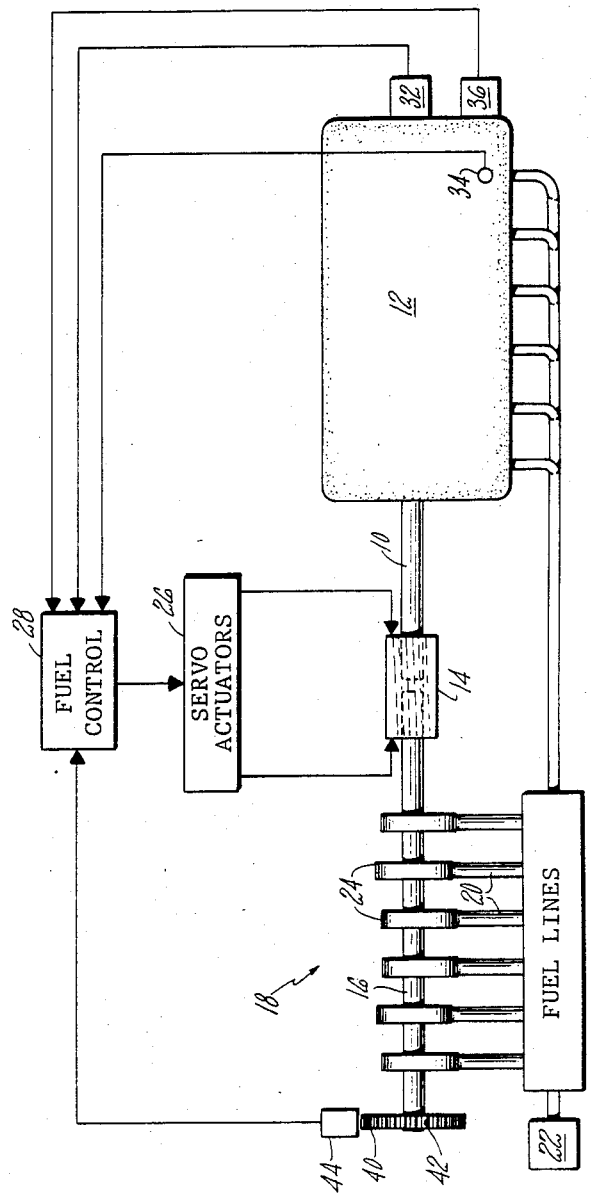

FUEL INJECTION CONTROL

DESCRIPTION

1. Technical Field of the Invention

The invention relates to fuel injection for internal combustion engines.

2. Background of the Invention

In the wake of recent stringent emissions controls and elevated fuel prices, it has become increasingly important to provide precise control over the combustion process in internal combustion engines. The invention is discussed in the context of diesel engines.

Fuel injection systems for diesel engines typically employ cam-driven pumps to inject metered charges of fuel into each cylinder at an appropriate time (angle) during the engine cycle. Although the pump itself is a mechanical device, its operation may be subject to an electronic fuel control that senses various engine operating parameters and dictates an appropriate pump operating characteristic, such as fuel pump timing.

Commonly-owned U.S. Pat. No. 3,726,608 (Bostwick et al, 1973) discloses a servo-actuated helically splined sleeve coupling the rotating member (camshaft) of the fuel pump to the rotating member (pump drive shaft) of the engine. By positioning the axial position of the helically splined sleeve from a neutral position, the relative angular position of the camshaft with respect to the pump drive shaft may be retarded or advanced for varying the timing of the fuel charge with respect to the engine cycle.

U.S. Pat. No 4,033,310 (Nicolls, 1977) relates to a control system which varies the timing of fuel injection. The control system receives signals indicative of the speed of and the load on the engine, and also a signal from a transducer indicative of the actual timing of injection of fuel to the engine and also a signal from a transducer indicating the position of the parts of the engine. The control circuit processes the signals to provide for variation in the timing of injection of fuel in accordance with the speed and the load, and also checks that the actual instant of injection is correct.

U.S. Pat. No. 4,265,200 (Wessel et al, 1981) relates to a control system which engages a final control element in the fuel injection pump that changes the injection timing, i.e. the onset of fuel delivery and, hence, the onset of fuel injection. The controlled variable is the moment of fuel injection, detected by suitable means placed near the injection valves.

Commonly-owned U.S. Pat. No. 4,463,729 (Bullis et al, 1984) discloses a start of combustion (SOC) sensor that provides a SOC signal indicative of the onset of a combustion event. The SOC signal is advantageously supplied to a timing control circuit which delivers a timing control signal to a fuel delivery device, such as the controller associated with a fuel pump. The control circuit stores one or more start of combustion values which indicate the desired timing, relative to an engine cycle, for the start of the combustion event as a function of speed and load. One or more adjustment signals are stored and applied as a function of speed and load to adjust the desired signal such that the control signal is corrected for delays. The actual SOC signal is compared with the desired signal to generate an error signal which may be used to finely adjust the stored SOC signal for particular speed and load conditions.

The aforementioned U.S. patents all dictate in open-loop manner a timing signal to the fuel injection pump based on either a sensed combustion event or the actual arrival of the metered fuel charge at the cylinder.

By contrast, the present invention relates to closed loop control over the timing of the fuel injection pump. Both speed and timing information may be derived from a sensor on the pump itself.

DISCLOSURE OF THE INVENTION

It is an object of this invention to provide an inherently reliable fuel injection fuel control.

According to the invention, information relating to relative fuel pump camshaft advance angle is compared with a SOC signal indicative of the start of combustion in a reference cylinder to generate an adaptive trim table which is used, in a first control scheme to calculate an actual combustion angle for closed loop control over combustion timing only in the event of a loss of the SOC signal. In an alternate control scheme, the values from the adaptive trim table are always used to calculate the actual combustion angle for closed loop control.

Other objects, advantages and features of the invention will become apparent in light of the following description.

BRIEF DESCRIPTION OF THE DRAWINGS

FIG. 1 is a schematic of the invention.

BEST MODE FOR CARRYING OUT THE INVENTION

FIG. 1 shows the basic components of this invention. A pump drive shaft 10 is driven by an engine 12. The pump drive shaft 10 is coupled via a helically-splined sleeve 14 to the camshaft 16 of a fuel pump 18. Individual plungers 20 in the fuel pump 18 supply a metered fuel charge from a pressurized fuel source 22 to individual cylinders of the engine 12 in response to the urgings of individual lobes 24 on the camshaft 16.

The sleeve 14 is axially positionable by servo actuators 26 to vary the relative angular position (timing) of the camshaft 16 with respect to the pump drive shaft 10, within a limited range of relative angular positions, while driving the camshaft, in syntony (at the same speed) with the pump drive shaft. The servo actuators 26 are responsive to a control signal from a microprocessor-based fuel control 28.

A sensor 32 provides a position signal indicative of a unique reference crankshaft position relative to engine TDC to the fuel control 28. A sensor 34, such as a start of combustion (SOC) sensor, provides a SOC signal to the fuel control 28 indicative of the onset of the combustion event or other phenomena indicative of the timing of the invention of the metered fuel charge in a reference cylinder. Sensors 36 provide additional signals indicative of engine operating parameters such as load (fuel consumption), ambient temperature, engine temperature, and throttle lever setting, each of which is provided to the fuel control 28.

A wheel 40 having a plurality of identical teeth 42 evenly spaced about its circumference is attached to the camshaft 16 opposite the splined sleeve 14. The number of teeth 42 may preferably be an integral multiple of the number of cylinders in the engine. A sensor 44 is positioned adjacent the circumference of the wheel 40 so that the teeth 42 are serially presented to the sensor. Each occurrence of tooth/sensor juxtaposition causes a pulse to be provided by the sensor 44 to the fuel control 28. It is well known to provide a suitable tooth profile and a suitable sensor such as a hall-effect device such that the rise time for a pulse is very fast for accurate determination of tooth/sensor juxtaposition and to measure the frequency of the pulses on the time interval between successive pulses to determine the rotational speed of the wheel. Since the rotational speed of the camshaft is generally always equal to the rotational speed of the pump drive shaft, and hence the engine, varying only slightly from equality during changes in the axial position of the splined sleeve, the sensor 44 provides engine speed information to the fuel control 28.

If the wheel 40 is fixed in a predetermined rotational manner with respect to the camshaft, such as machined onto the camshaft, the camshaft advance angle can readily be determined with reference to the crankshaft based on the speed of rotation, magnitude of the control signal, and the time interval between the crankshaft reference position signal and a particular sensor 44 pulse, such as the pulse immediately after the crankshaft reference position signal. Thus, an actual cam timing signal can be obtained from the sensor 44, as well as the cam speed signal.

It will be appreciated hereinafter, however, that there may not be a need to accurately fix the wheel 40 to the crankshaft 16 while nevertheless maintaining precise control over injection.

With the information provided by the above described sensors 32, 34, 36, 44 the actual timing of the combustion event is controlled in the fuel control in the following manner.

In a first control scheme a temperature dependent desired combustion angle for the reference cylinder is generated in a lookup table, or tables, in the fuel control 28. The tables are based on load and speed and, in the case of multiple tables, the desired combustion angle is determined by interpolation.

An actual combustion angle is calculated in the fuel control 28 by measuring the time interval between the crankshaft reference position signal and the SOC signal, and multiplying the time interval by the engine speed (based on the cam speed signal) to give the angle between the onset of the combustion event in the reference cylinder and the reference crankshaft position. In other words, the SOC signal is used for primary control.

The actual combustion angle is compared with the desired combustion angle. A combustion angle error signal resulting from a discrepancy therebetween is passed through a proportional integral derivative (PID) filter to provide the control signal to adjust the servo actuators and thus obtain a desired cam angle position. The PID filter is set for high gain and good stability.

An adaptive trim table is maintained in the fuel control 28 to provide a backup procedure in the event that the SOC signal is not available (such as in coasting), or within known operating limits.

For instance, the adaptive trim table would store values indicative of the angle between the tooth after the crankshaft reference position signal and the SOC signal as a function of speed while the SOC signal is present, constantly updating itself. When the SOC signal is lost, it can be simulated from the tooth/sensor pulse immediately after the crankshaft reference postion signal and the adaptive trim table. The simulated SOC signal so provided would be used in the aforementioned calculation of actual combustion angle in the control scheme. A benefit of using such an adaptive trim table is that ambient conditions affecting ignition delay are accounted for.

In an alternate control scheme the adaptive trim table is used as the primary control, rather than as a backup. In other words, the SOC signal is used in conjunction with a particular tooth/sensor pulse after the crankshaft reference position signal to generate the adaptive trim tables in the aforementioned manner, and the values from the adaptive trim tables are always used to generate a value for the actual angle of combustion. If the SOC signal is lost, the latest values in the adaptive trim tables are used.

An advantage of these control schemes is that the wheel 40 need not be precisely fixed to the camshaft 16, since timing information provided thereby is simply used in a relative manner to generate the backup adaptive trim tables. A slight disadvantage of the first control scheme is that the SOC signal, which is used for primary control, is provided only every other revolution. But this is not considered to be a practical limitation.

In the alternate control scheme, i.e. using the adaptive trim tables for primary control, the tooth/sensor pulse is the primary control. Therefore, a one per rev control signal is provided. However, torsional "noise" may be a slight problem.

It is apparent in the control scheme of this invention that any suitable position sensor, such as a sensor like the sensor 32, could be used on the camshaft to provide a pulse signal for camshaft angle determination.

We claim:

1. A method of controlling combustion angle in an engine responsive to a fuel injector pump comprising:
   generating a table of desired combustion angles for a reference cylinder under various sensed engine operating conditions;
   measuring the various engine operating conditions and plugging their values into the table;
   providing a SOC signal indicative of the start of combustion in the reference cylinder;
   providing a cam timing signal indicative of a particular fuel injector pump position;
   generating an adaptive trim table containing values indicative of an angle between the SOC signal and the cam timing signal;
   calculating an actual combustion angle as a function of the SOC signal in the presence of the SOC signal;
   calculating the actual combustion angle in the absence of the SOC signal as a function of the cam timing signal and the values contained in the adaptive trim table;
   providing means for adjusting the fuel injector pump timing with respect to the engine rotation in response to a control signal; and
   providing the control signal as a function of the difference between the desired combustion angle and the actual combustion angle.

2. A method of controlling combustion angle in an engine responsive to a fuel injector pump comprising:
   generating a table of desired combustion angles for a reference cylinder under various sensed engine operating conditions;
   measuring the various engine operating conditions and plugging their values into the table;
   providing a SOC signal indicative of the start of combustion in the reference cylinder;
   providing a cam timing signal indicative of a particular fuel injector pump position;

generating an adaptive trim table containing values indicative of an angle between the SOC signal and the cam timing signal;
calculating an actual combustion angle as a function of the cam timing signal and the values contained in the adaptive trim table;
providing means for adjusting the fuel injector pump timing with respect to the engine rotation in response to a control signal; and
providing the control signal as a function of the difference between the desired combustion angle and the actual combustion angle.

* * * * *